United States Patent [19]
Jablonski et al.

[11] Patent Number: 5,479,009
[45] Date of Patent: Dec. 26, 1995

[54] HIGHLY EFFICIENT COLLECTION OPTICAL SYSTEMS FOR PROVIDING LIGHT DETECTORS SUCH AS PHOTODETECTORS AND THE LIKE WITH HEMISPHERICAL FIELDS OF VIEW

[75] Inventors: Joseph W. Jablonski, Pembroke; Kevin F. Carr, Sunapee, both of N.H.

[73] Assignee: Labsphere, Inc., N. Sutton, N.H.

[21] Appl. No.: 289,620

[22] Filed: Aug. 12, 1994

Related U.S. Application Data

[63] Continuation of Ser. No. 951,089, Sep. 25, 1992, abandoned.

[51] Int. Cl.$^6$ .................. G01C 3/08; G02B 5/10
[52] U.S. Cl. .................. 250/229; 359/853; 359/868; 126/694; 126/695; 356/236
[58] Field of Search .................. 359/851, 852, 359/853, 857, 868, 869; 126/692, 888, 695, 694, 693; 250/229; 356/236

[56] References Cited

U.S. PATENT DOCUMENTS

| | | | |
|---|---|---|---|
| 3,923,381 | 12/1975 | Winston | 350/293 |
| 3,957,031 | 5/1976 | Winston | 126/270 |
| 4,002,499 | 1/1977 | Winston | 136/206 |
| 4,003,638 | 1/1977 | Winston | 350/293 |
| 4,045,246 | 8/1977 | Mlavsky et al. | 359/867 X |
| 4,114,592 | 9/1978 | Winston | 359/867 X |
| 4,129,115 | 12/1978 | Wyatt | 359/867 X |
| 4,284,068 | 8/1981 | Gunderson | 126/692 X |
| 4,284,069 | 8/1981 | Horster et al. | 126/692 X |
| 4,541,414 | 9/1985 | Mori | 359/867 X |

FOREIGN PATENT DOCUMENTS

| | | | |
|---|---|---|---|
| 1231332 | 5/1986 | U.S.S.R. | 126/695 |

*Primary Examiner*—Edward K. Look
*Assistant Examiner*—Hoang Nguyen
*Attorney, Agent, or Firm*—Rines & Rines

[57] ABSTRACT

This invention involves a novel egg-shaped hollow dual-compound conical light-ray concentrator with mirror-like inner walls (preferably tandem substantially inverted paraboloidal and ellipsoidal conical sections) for receiving light through one aperture end, as from an integrating sphere, and concentrating and collecting the rays within said walls and directing them to a detector at an opposite aperture end. This construction attains both high collection efficiency and hemispherical angular response.

6 Claims, 1 Drawing Sheet

HIGHLY EFFICIENT COLLECTION OPTICAL SYSTEMS FOR PROVIDING LIGHT DETECTORS SUCH AS PHOTODETECTORS AND THE LIKE WITH HEMISPHERICAL FIELDS OF VIEW

The present application is a file wrapper continuation of parent application Ser. No. 951,089, filed Sep. 25, 1992 now abandoned.

The present invention relates to photodiode or other light-detection collection optics, being concerned primarily, though not exclusively, with substantially hemispherical fields of view (FOV) and in an important application, to use with spectrophotometric light integrating spheres and the like. The term "light" is used herein to connote both invisible and invisable electromagnetic radiation.

BACKGROUND

A lens is an image-forming optical device which collects and concentrates light flux density. Lens systems can produce excellent image quality but have limited light concentration power. In considering the theoretical limits of concentration, optical physicists have developed a class of optical devices that would have very large aberrations if used in image-forming systems but do exhibit very high light concentration power.

Two such non-imaging light concentrator devices are the Compound Parabolic Concentrator (CPC) and the Compound Elliptical Concentrator (CED). "Compound" implies the cone is rotated about an axis other than its natural axis.

The CPC is intended to collect and concentrate light from a distant point source. The design of a 3D CPC is such that radiation enters a larger aperture within a specific incident angle and is concentrated to a smaller aperture, leaving in a hemispherical distribution. It is the most common concentrator often used in solar energy systems, having been first proposed as an attachment to the photomultiplier detectors used in Cerenkov radiation counters employed in particle physics as described, for example, in Hinterberger, H. and R. Winston, "EFFICIENT LIGHT COUPLER FOR THRESHOLD CERENKOV COUNTER". *Rev. Sci. Inst.*, 37, 1094–1095. Other early applications involved concentration onto photodetectors used in infrared astronomy as explained in B HARPER, D. A., R. J. HILDEBRAND, ET AL, "HEAT TRAP: AN OPTIMIZED FAR INFRARED FILED OPTICS SYSTEM", APPLIED OPTICS, 15, 53–60 (1976).

Recently, it has been proposed that the CPC cone concentrator could be used to control the FOV of photodetectors in instruments designed for measuring the diffuse reflectance of surfaces, as in SNAIL, K. A., "REFLECTOMETER DESIGN USING NONIMAGING OPTICS", *APPLIED OPTICS*, 26, 24, 5326–5332 (1987). The cone is inverted so that the incident light would enter hemispherically through the smaller aperture impinging upon a photodetector positioned at the larger aperture. An additional advantage is that the CPC can be designed to control the incident angle for rays striking the photodetector.

Turning to the CEC, such is optimized to collect and concentrate light from a nearby extended source. The radiation emanating from within the boundaries of the source are accepted by the large aperture of the CEC to be concentrated onto the smaller aperture.

Recently CED's have been used with the photodetectors of integrating spheres, as set forth in LANG, M. C. AND K. D. MASTERSON, "COMPOUND ELLIPSOID CONCENTRATOR BAFFLED INTEGRATING SPHERE", *J. OPT. SOC. AM.*, 70, 1564A (1980); TARDY, M. L., "FLUX CONCENTRATORS IN INTEGRATING SPEHERE EXPERIMENTS: POTENTIAL FOR INCREASED DETECTOR SIGNAL", *APPLIED OPTICS*, 24, 22, 3914–3916 (1985); and SNAIL, K. A., SNAIL AND K. F. CARR, "OPTICAL DESIGN OF AN INTEGRATING SPHERE FOURIER TRANSFORM SPECTROPHOTOMETER (FTS) EMMISSOMETER," *PROCEEDINGS SPIE*, 64B, 234–250 (1986). The major application has involved infrared detectors mounted within liquid nitrogen dewars. The dewar inherently spaces the detector element at some distance from the inner sphere wall, reducing the flux density incident on the detector. The introduction of a CEC between the sphere port opening and detector element virtually negates the spacing losses. The CEC also better defines the detector's FOV on the opposing section of sphere surface.

Most detectors, however, exhibit non-uniform responsivity across their sensitive area. In situations where uniform responsivity is necessary, detector attachments are required. The most common attachments are diffusers. These include flat pieces of translucent opal glasses and plastics or perhaps even an integrating sphere with a specific entrance aperture. Applications include solar irradiance measurements on the earth's surface by pyronometers or spectroradiometers.

The major problem associated with diffusers is their drastic attenuation of incident light by absorption and scattering. These losses can generally be tolerated with "visible" light because of high source energies and very high detector signal-to-noise ratios (SNR). However, in the infrared where source energies are several factors lower and detector SNR is many magnitudes lower, any loss in signal cannot be tolerated.

One special case applies to using a photodetector with an integrating sphere used to measure the diffuse reflectance of surfaces over wide spectral ranges. The integrating sphere is intended to redistribute the spatial distribution of reflected flux. This simplifies the technique compared to directly measuring an otherwise complex flux distribution. A correct average of the incident flux is obtained if the photodetector signal is a true average of the flux redistribution within the integrating sphere. This is best accomplished by a photodetector which receives light equally from over the entire sphere surface. In this condition it can be stated that the photodetector features a hemispherical FOV.

Each type of concentrator (CPC and CEC) used independently as an attachment to integrating sphere detectors, moreover, has serious drawbacks.

The CEC effectively concentrates the flux density from the sphere port onto the photodetector, but its FOV is not hemispherical and, therefore, does not properly average the spatial distribution of flux inside the sphere.

The inverted CPC can approach the hemispherical FOV but its inverted configuration cannot concentrate the flux density. One may counter this by using a large area photodetector to fill the large aperture of the CPC. This, however, inherently increases the detector generated noise (especially for IR detectors). Therefore, an increase in signal is offset by no improvement in the SNR.

Underlying the present invention, on the other hand, is the discovery that CPC and CEC concentrators may be synergistically combined not only to obviate the disadvantages of each, but to produce highly novel results. With the two concentrators used in a special way in tandem, the inverted CPC may be coupled directly to the sphere port opening to receive rays from over the subtended hemisphere. The CEC is then used to concentrate the flux at the larger aperture onto a small area photodetector. Smaller IR photodetectors can provide the maximum detector limited SNR performance through increased responsivity and specific detectivity.

Although application of this device in the IR is probably the most significant, it can easily be extended to other spectral regions.

OBJECTS OF INVENTION

An object of the present invention, accordingly, is to provide a new and improved combined concentrator system, preferably embodying tandem CPC concentration and inverted CEC concentration.

Other and further objects will be explained hereinafter and are more particularly delineated in the appended claims.

SUMMARY OF INVENTION

To summarize:

Cone CPC concentrators have been used in the past to improve collection efficiency, at the expense of angular response. Cone CEC concentrators have been used (usually "inverted") to tailor angular response, at the expense of efficiency.

The invention described herein combines the two techniques, achieving the advantages of both without the disadvantages of either.

The crux of the invention is using two compound concentrators, back to back, to accomplish both high collection efficiency and hemispherical angular response.

From one viewpoint, the invention embraces a three-dimensional hollow composite conical light concentrator enclosure of substantially egg shape having mirror-like inner walls and opposing end apertures for respectively receiving incident light at one end and for directing light concentrated and collected from the inner walls within the enclosure for detection at the aperture at the other end. Preferred embodiments and best mode designs are later presented.

DRAWINGS

The invention will now be described with reference to the accompanying drawings, FIG. 1 of which is a longitudinal cross section of the system of the invention in dual-cone egg-shaped preferred form; and FIG. 2 is a modification showing an example of light ray concentration and collection for infra red applications.

DESCRIPTION OF PREFERRED EMBODIMENT OF INVENTION

As before discussed, underlying the present invention is the finding that CPC and CEC type non-imaging optical concentrators can provide a photodetector with both uniform angular responsivity and high radiometric efficiency.

The separate concentrators, as earlier explained, either improve collection efficiency at the expense of angular response or tailor angular response at the expense of efficiency. Among prior devices of this character are those disclosed, for example, in Winston U.S. Pat. Nos. 3,923,381; 3,957,031; 4,003,638 and 4,002,499; and, also, Ploke German patent application 14722679 (1969).

Figure 1:
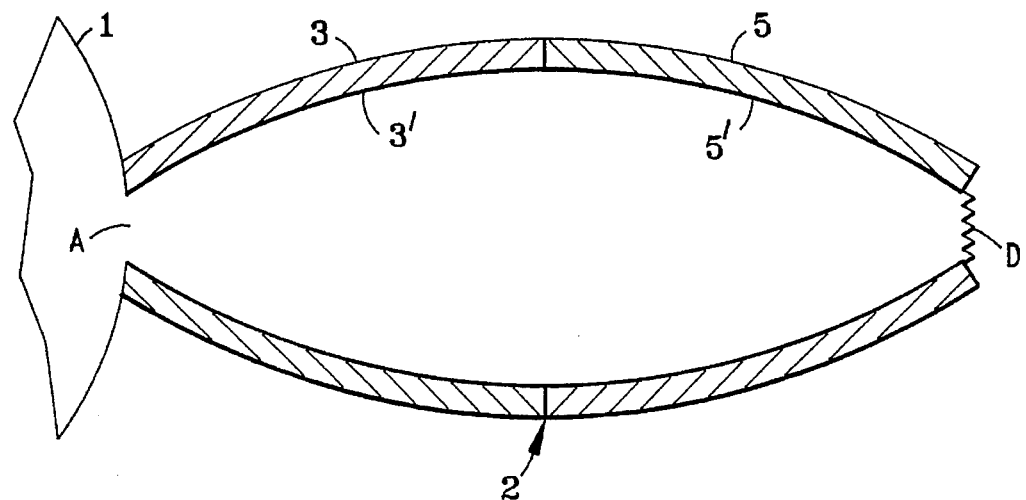

The novel tandem collector combination of the invention is shown in FIG. 1, applied for use with an integrating spectophotometric hollow sphere 1, the light-ray integrating reflections and scatter within which emerge at aperture A and are to be detected by a photodetector D. Interposed between the aperture A and the photodetector D is the dual composite cone concentrator system of the invention comprising, at the left-hand section, an inverted symmetrical hollow cone 3 embodying the opening A (typically compound parabolic curvalinear configuration), and, at the right-hand section, a symmetrical hollow collecting cone 5 (typically compound elliptical configuration), abutting at the break 2, and with the same cone cross-sectional dimensions thereat and preferably the same symmetrical axial lengths to permit a continuous hollow symmetrical egg-like three-dimensional enclosure. The inner walls of the egg-shaped cone combination 3–5 are mirror or mirror-like surfaces 3' and 5', and the right-hand terminal opening of the collecting cone 5 receives or is directed upon the detector D.

In accordance with this construction a substantially hemispherical 180° light-ray field of view is provided by the inverted cone portion 3, with the collecting cone portion directing the light onto the relatively small recessed detector at the right-hand aperture, which may be similar to aperture A. The light entering from end aperture A enters the larger cross-section of the cone 3 and is concentrated by cone 5 onto the small detector aperture at D, at the opposite end. These two back-to-back compound concentrators most advantageously accomplish both high collection efficiency and hemispherical angular response.

Figure 2:
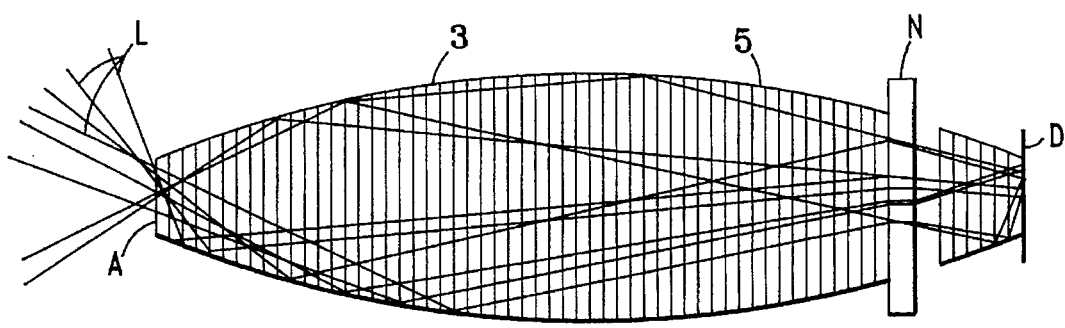

Typical light ray tracings are shown in FIG. 2 for infra red applications, wherein a liquid nitrogen or other suitable dewar N is interposed in the enclosure in advance of the detector D.

While shown in preferred respective inverted paraboloidal and ellipsoidal tandem surface sections, the advantageous features of the technique of the invention can also be obtained, in various degrees, with other curvalinear surface shapes, as well. In some instances, non-symmetrical length-cone sections may be desired; and further modifications will also occur to those skilled in this art, being considered to fall within the spirit and scope of the invention as defined in the appended claims.

What is claimed is:

1. An optical light collection system, having, in combination, a three-dimensional hollow composite light concentrator enclosure formed by dual-compound abutting back-to-back conical inner and outer wall sections together defining a substantially egg shape open at opposite ends, the inner walls being mirror-like and the enclosure having opposing light-receiving and light detecting end apertures at said opposite ends for respectively receiving incident light at one end and for directing light concentrated and collected from the inner walls within the enclosure for detection at the aperture at the other end and in which the system is connected at said one end to an aperture of a hollow light-integrating sphere, and at said other end to photodetector means.

2. A system as claimed in claim 1 and in which the egg-shaped enclosure comprises an inverted curvilinear concentrating cone section abutting a substantially symmetrical curvilinear collecting cone section.

3. A system as claimed in claim 2 and in which the concentrating cone section is of substantially parabolic shape and the collecting cone section is of substantially elliptical shape.

4. An optical light collection system having, in combination, a three-dimensional hollow composite light concentrator enclosure formed by dual-compound abutting back-toback conical inner and outer wall sections together defining a substantially egg shape open at opposite ends, the inner walls being mirror-like and the enclosure having opposing light-receiving and light detecting end apertures at said opposite ends for respectively receiving incident light at one end and for directing light concentrated and collected from the inner walls within the enclosure for detection at the aperture at the other end and in which the light is infrared and a liquid nitrogen dewar is mounted within the enclosure near the detection end thereof.

5. A system as claimed in claim 4 and in which the egg-shaped enclosure comprises an inverted curvilinear concentrating cone section abutting a substantially symmetrical curvilinear collecting cone section.

6. A system as claimed in claim 5 and in which the concentrating cone section is of substantially parabolic shape and the collecting cone section is of substantially elliptical shape.

* * * * *